(12) United States Patent  
Yokohashi et al.

(10) Patent No.: US 11,720,773 B2
(45) Date of Patent: Aug. 8, 2023

(54) INFORMATION PROCESSING APPARATUS, PRINTING APPARATUS, AND NON-TRANSITORY COMPUTER READABLE MEDIUM STORING PROGRAM

(71) Applicant: FUJIFILM Business Innovation Corp., Tokyo (JP)

(72) Inventors: Mami Yokohashi, Kanagawa (JP); Kota Matsuo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 18 days.

(21) Appl. No.: 17/408,470

(22) Filed: Aug. 22, 2021

(65) Prior Publication Data

US 2022/0374665 A1    Nov. 24, 2022

(30) Foreign Application Priority Data

May 20, 2021    (JP) .................................. 2021-085624

(51) Int. Cl.
  *G06K 15/02* (2006.01)
  *G06F 3/12* (2006.01)
  *G06K 15/00* (2006.01)

(52) U.S. Cl.
  CPC ......... *G06K 15/408* (2013.01); *G06K 15/002* (2013.01); *G06K 15/4065* (2013.01)

(58) Field of Classification Search
  None
  See application file for complete search history.

(56) References Cited

U.S. PATENT DOCUMENTS

| | | | |
|---|---|---|---|
| 2001/0053304 A1* | 12/2001 | Noda | G06F 3/1204 400/578 |
| 2005/0002054 A1 | 1/2005 | Shoji et al. | |
| 2005/0030334 A1 | 2/2005 | Kai et al. | |
| 2010/0135680 A1 | 6/2010 | Adachi et al. | |
| 2018/0275590 A1* | 9/2018 | Nemoto | G03G 15/6564 |
| 2020/0140215 A1* | 5/2020 | Ogasawara | B65H 7/16 |
| 2020/0192261 A1 | 6/2020 | Ogata et al. | |

FOREIGN PATENT DOCUMENTS

| | | | | |
|---|---|---|---|---|
| JP | H0881073 | * | 3/1996 | ............. G03G 21/00 |
| JP | H1124512 | * | 1/1999 | ............. G03G 15/00 |
| JP | H1161063 | * | 3/1999 | ............. B41J 29/17 |
| JP | 2012027095 | * | 2/2012 | ............. G03G 15/00 |
| JP | 2017116802 | * | 6/2017 | ............. G03G 15/00 |
| JP | 2020097170 | | 6/2020 | |
| JP | 2020100490 | | 7/2020 | |
| JP | 2021039178 | * | 3/2021 | ............... H04N 1/00 |

OTHER PUBLICATIONS

"Search Report of Europe Counterpart Application", dated Mar. 1, 2022, pp. 1-8.

* cited by examiner

*Primary Examiner* — Beniyam Menberu
(74) *Attorney, Agent, or Firm* — JCIPRNET

(57) ABSTRACT

An information processing apparatus includes at least one processor configured to: acquire physical-property-value information of a recording medium; using information regarding a printing machine, perform an evaluation as to whether there is a possibility that the recording medium causes trouble for printing by the printing machine, the evaluation being performed with respect to at least one printing performance indicator based on the physical-property-value information; and output a result of the evaluation to a display device.

20 Claims, 16 Drawing Sheets

FIG. 4A

| PERFORMANCE INDICATOR | |
|---|---|
| TRANSPORT PROPERTY | BASIS WEIGHT · THICKNESS · SMOOTHNESS · BENDING STIFFNESS · FRICTION COEFFICIENT · ELECTRIC RESISTANCE |
| TRANSFER PROPERTY | BASIS WEIGHT · THICKNESS · DENSITY · SMOOTHNESS · ELECTRIC RESISTANCE · MOISTURE CONTENT |
| FIXING PROPERTY | BASIS WEIGHT · THICKNESS · SMOOTHNESS · BENDING STIFFNESS · ELECTRIC RESISTANCE · GLOSSINESS |

FIG. 4B

| PERFORMANCE INDICATOR | |
|---|---|
| STAPLING | THICKNESS · BENDING STIFFNESS |

FIG. 5

| | Transport Property | | | | | | Transfer Property | | | |
|---|---|---|---|---|---|---|---|---|---|---|
| | Bending Stiffness | | | Basis Weight | | | Smoothness | | | |
| | Forbidding Lower Limit | Restriction Lower Limit | Restriction Upper Limit | Forbidding Upper Limit | Forbidding Lower Limit | Restriction Lower Limit | Restriction Upper Limit | Forbidding Lower Limit | Restriction Lower Limit | Forbidding Upper Limit | Restriction Upper Limit |
| Model A | 1 | 3 | 500 | 600 | 50 | — | — | 5 | 10 | 350 | — |
| Model B | 1 | 3 | 500 | 600 | 40 | — | — | 1 | 10 | 400 | — |

FIG. 6

| PERFORMANCE INDICATOR | | CRITERION | MESSAGE | PROFILE CREATION |
|---|---|---|---|---|
| TRANSPORT PROPERTY | C | FORBIDDING THRESHOLD < BASIS WEIGHT OR BASIS WEIGHT < FORBIDDING THRESHOLD | The basis weight of this sheet does not allow transport. The basis weight is outside the acceptable range. | IMPOSSIBLE |
| | B | FORBIDDING THRESHOLD < BASIS WEIGHT < RESTRICTION THRESHOLD | Some jobs may cause a jam. | POSSIBLE |
| | B | BENDING STIFFNESS < THRESHOLD, AND SMOOTHNESS < THRESHOLD, AND BASIS WEIGHT < THRESHOLD | Wrinkles or folds may occur. A jam may occur. | POSSIBLE |
| TRANSFER PROPERTY | B | SMOOTHNESS < THRESHOLD | Roughness may occur. | POSSIBLE |
| | B | RESTRICTION THRESHOLD < BASIS WEIGHT < FORBIDDING THRESHOLD | Some jobs may cause roughness. | POSSIBLE |
| FIXING PROPERTY | B | THRESHOLD < VOLUME RESISTANCE AND COLOR-SENSOR VALUE < THRESHOLD (GRADED AS TRANSPARENT OR BLACK) | Printing on film may cause fixing failure or toner peel-off. | POSSIBLE |

C ··· UNUSABLE SHEET
B ··· CONDITIONALLY USABLE SHEET

FIG. 12

Evaluation Result
Grade: C  Unusable Sheet

|  | Grade | Information |
|---|---|---|
| Transport Property | C | Transporting this sheet is not allowed. |
| Transfer Property | A |  |
| Fixing Property | A |  |

Evaluation Result
Grade: B  Check Restriction

|  | Grade | Information |
|---|---|---|
| Transport Property | A |  |
| Transfer Property | B | Roughness may occur. |
| Fixing Property | A |  |

Evaluation Result
Grade: C    Unusable Sheet

|  | Grade | Information |
|---|---|---|
| Transport Property | C | Transporting this sheet is not allowed. |
| Transfer Property | B | Roughness may occur. |
| Fixing Property | A |  |

Evaluation Result
Grade: B    Check Restriction

|  | Grade | Information |
|---|---|---|
| Transport Property | B | Some jobs may cause a jam.<br>Wrinkles or folds may occur.<br>A jam may occur. |
| Transfer Property | B | Roughness may occur. |
| Fixing Property | A |  |

| TRANSPORT PROPERTY | BASIS WEIGHT | | | | | |
|---|---|---|---|---|---|---|
| | | COATED SHEET | | UNCOATED SHEET | | |
| | | LOWER LIMIT | UPPER LIMIT | LOWER LIMIT | UPPER LIMIT | |
| MODEL A | | 100 | 350 | 50 | 350 | |
| MODEL B | | 40 | 400 | 40 | 400 | |

INFORMATION PROCESSING APPARATUS, PRINTING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-085624 filed May 20, 2021.

BACKGROUND

(i) Technical Field

The present disclosure relates to an information processing apparatus, a printing apparatus, and a non-transitory computer readable medium storing a program.

(ii) Related Art

Japanese Unexamined Patent Application Publication No. 2020-97170 discloses a setting determination apparatus including a hardware processor and a measurer that measures a physical property of a medium. The hardware processor specifies a basis weight and a type of the medium based on a result of the measurement by the measurer and outputs the specified basis weight and type of the medium as a medium setting candidate for an operation setting for image forming.

Japanese Unexamined Patent Application Publication No. 2020-100490 discloses an image forming apparatus including a transport unit that transports a medium on which an image is formed, a first detection unit that detects a basis weight of the medium, which is transported by the transport unit, a second detection unit that detects whether the type of the medium, which is transported by the transport unit, is an envelope, and a determining unit that determines, in accordance with a detection result obtained by the second detection unit, whether to detect a basis weight of the medium by using the first detection unit or whether to use a detection result obtained by the first detection unit.

SUMMARY

For example, transporting a recording medium that is unusable for a printing machine sometimes causes a jam of the recording medium. In other situations, an image printed on a recording medium does not provide an expected quality, and a large number of printed materials are discarded. The degree of tolerance for the image quality of an image printed on a recording medium varies from user to user. Thus, some users want to perform printing even on a recording medium that is expected to cause degradation of the image quality to some extent, and other users do not.

Aspects of non-limiting embodiments of the present disclosure relate to providing an information processing apparatus, a printing apparatus, and a non-transitory computer readable medium storing an information processing program that can provide information that enables a user to determine whether a recording medium is usable. The user can make such a determination with respect to each performance indicator of the printing machine even without setting information of existing recording media, as compared with the case where physical-property-value information of a recording medium and the type information of existing recording media are used to perform an evaluation as to whether the recording medium is usable for printing by a predetermined printing machine.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus that includes at least one processor configured to: acquire physical-property-value information of a recording medium; using information regarding a printing machine, perform an evaluation as to whether there is a possibility that the recording medium causes trouble for printing by the printing machine, the evaluation being performed with respect to at least one printing performance indicator based on the physical-property-value information; and output a result of the evaluation to a display device.

BRIEF DESCRIPTION OF THE DRAWINGS

Exemplary embodiments of the present disclosure will be described in detail based on the following figures, wherein:

FIG. 4A depicts an example of printing performance indicators used to perform an evaluation of a recording medium for the information processing apparatus, and FIG. 4B depicts an example of a performance indicator of a post-processing machine, the performance indicator being used to perform an evaluation of a recording medium for the information processing apparatus;

FIG. 5 depicts an example of a table specifying thresholds for physical-property values of a recording medium, and the table is stored in the information processing apparatus;

FIG. 6 depicts an example of evaluations of a recording medium for the information processing apparatus and indicates evaluation criteria for each printing performance indicator of a recording medium, messages to be presented, and whether to create a profile;

FIG. 12 is an illustration depicting a second example of an evaluation result indicating that the use of a recording medium is forbidden, and the evaluation result is presented by the display device of the information processing apparatus according to the first exemplary embodiment;

FIG. 13 is an illustration depicting a third example of an evaluation result indicating that the use of a recording medium is subject to restriction, and the evaluation result is presented by the display device of the information processing apparatus according to the first exemplary embodiment;

FIG. 14 is an illustration depicting a fourth example of an evaluation result indicating that the use of a recording medium is forbidden and is subject to restriction, and the evaluation result is presented by the display device of the information processing apparatus according to the first exemplary embodiment;

FIG. 15 is an illustration depicting a fifth example of an evaluation result indicating that the use of a recording medium is subject to restriction, and the evaluation result is presented by the display device of the information processing apparatus according to the first exemplary embodiment;

FIG. 16 depicts an example of a table specifying thresholds for a physical-property value of each type of recording medium, and the table is stored in the information processing apparatus;

DETAILED DESCRIPTION

Figure 1:
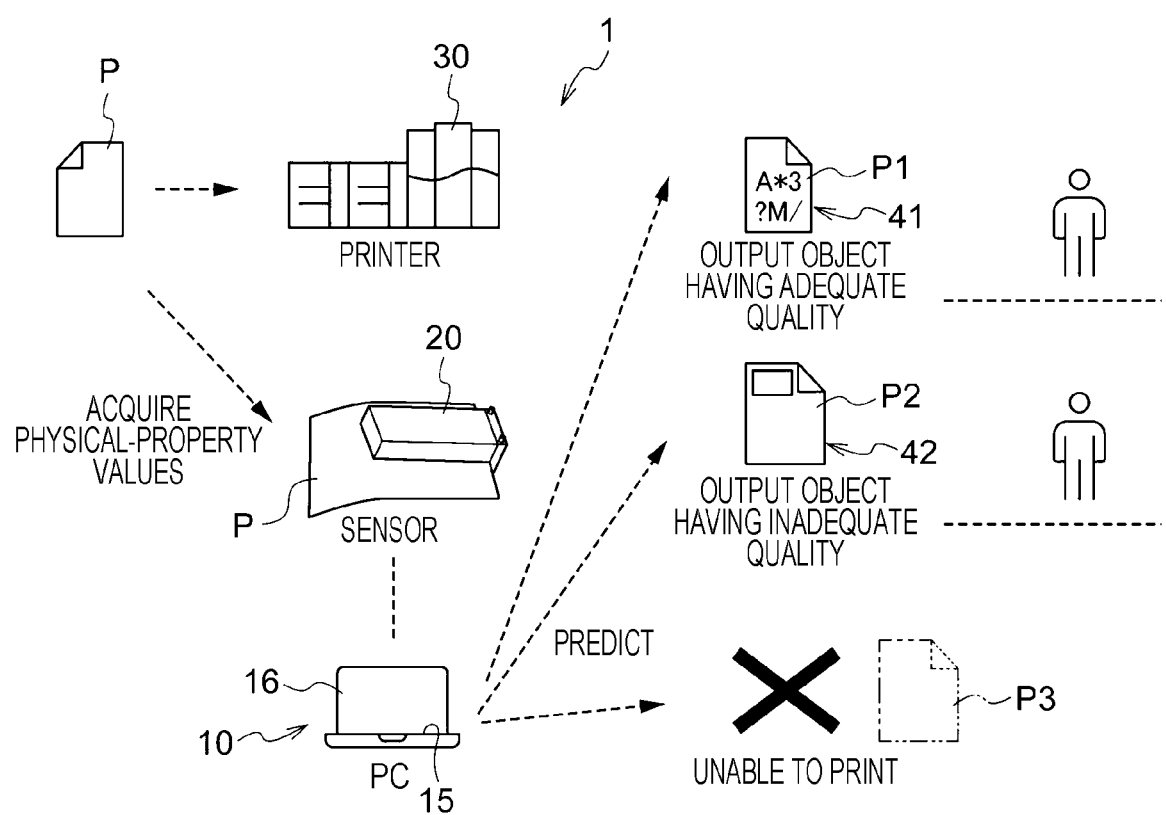
FIG. 1 is an illustration depicting a schematic configuration of an information processing system to which an information processing apparatus according to a first exemplary embodiment is applied.

Hereinafter, exemplary embodiments according to the present disclosure will be described with reference to the drawings. In the drawings, the same or equivalent components and parts are denoted by the same reference signs. The dimensions and proportions in the figures are emphasized for the sake of description and are not necessarily drawn to scale.

First Exemplary Embodiment

FIG. 1 is an illustration depicting a schematic configuration of an information processing system to which an information processing apparatus according to a first exemplary embodiment is applied.

As depicted in FIG. 1, an information processing system 1 includes a user terminal 10 as an example of the information processing apparatus, a sensor 20 that measures physical properties of a recording medium P, and a printer 30 as an example of a printing machine. For example, the printer 30 is not limited to a single printer and may include multiple printers 30 of different models, which are not depicted in FIG. 1.

In the information processing system 1 according to the first exemplary embodiment described in the example, the user terminal 10 is not linked to the printer 30, that is, the user terminal 10 is not electrically connected to the printer 30. According to the first exemplary embodiment, to examine performance indicators of the printer 30, any user terminal 10 is used to perform an evaluation as to whether the recording medium P is usable. The recording medium P is a medium on which an image is recorded. In the present description, the recording medium P is sometimes referred to as a "medium".

With respect to each performance indicator of the printer 30, the user terminal 10 performs an evaluation as to whether the recording medium P is usable. For example, the user terminal 10 is formed by a personal computer (PC). The user terminal 10 includes an input unit 15 and a display 16. For example, the input unit 15 of the user terminal 10 is used to enter information regarding the printer 30 and other information. The information regarding the printer 30 includes model information of the printer 30 and information to individually identify the printer 30 (for example, a serial number). In addition, the display 16 of the user terminal 10 presents an evaluation result indicating whether the recording medium P is usable.

With respect to each performance indicator of the printer 30, the user terminal 10 performs an evaluation as to whether the recording medium P is usable and outputs an evaluation result to the display 16, providing material based on which a user can determine, with respect to the performance indicator of the printer 30, whether the recording medium P is usable.

For example, the sensor 20 is electrically connected to the user terminal 10. Examples of a physical property of the recording medium P to be measured by using the sensor 20 include such parameters of the recording medium P as a basis weight, a thickness, smoothness, bending stiffness, a friction coefficient, and an electrical resistance (refer to FIG. 4A). Not all the physical-property values depicted in FIG. 4A need to be used for an evaluation of the recording medium P. The measurement information regarding the physical properties measured by using the sensor 20 for the recording medium P is entered into the user terminal 10. Instead of the above configuration, the sensor 20 may be electrically separated from the user terminal 10. In such a case, a measurement value obtained by the sensor 20 is received by a receiver of the user terminal 10 via a wireless communication device.

The printer 30 performs printing on the recording medium P. The printer 30 includes a printing unit that performs printing on the recording medium P. A system of printing adopted by the printing unit of the printer 30 is not limited to any particular system. For example, the printer 30 may form an image on the recording medium P by using an electrophotographic system or by using an inkjet system. Instead of these systems, the printer 30 may perform printing on the recording medium P by using a printing plate.

According to the present exemplary embodiment, as described above, with respect to each performance indicator of the printer 30, the user terminal 10 performs an evaluation as to whether the recording medium P is usable. For example, if an evaluation result indicates that a recording medium P1 is usable for the printer 30, a user uses the recording medium P1 to perform printing by using the printer 30 and thereby obtains an output object 41 having a printed image on the recording medium P1. The output object 41 has an adequate image quality.

For example, if an evaluation result indicates that the use of a recording medium P2 for the printer 30 is subject to restriction, the degree of tolerance for the restriction on the recording medium P2 sometimes varies from user to user. For example, some users want to perform printing even on the recording medium P2, which is expected to cause degradation of the image quality to some extent, and other users do not. If a user accepts the restriction on the recording medium P2, the user uses the recording medium P2 to perform printing by using the printer 30 and thereby obtains an output object 42 having a printed image on the recording medium P2. It is possible that the output object 42 has an image quality degraded to some extent.

For example, if an evaluation result indicates that a recording medium P3 is unusable for the printer 30, a user cannot obtain a printed material by using the recording medium P3 for the printer 30. A description will be given below of specific configurations and operations in which the user terminal 10 performs an evaluation as to whether the recording medium P is usable, the evaluation being performed with respect to each performance indicator of the printer 30.

Figure 2:
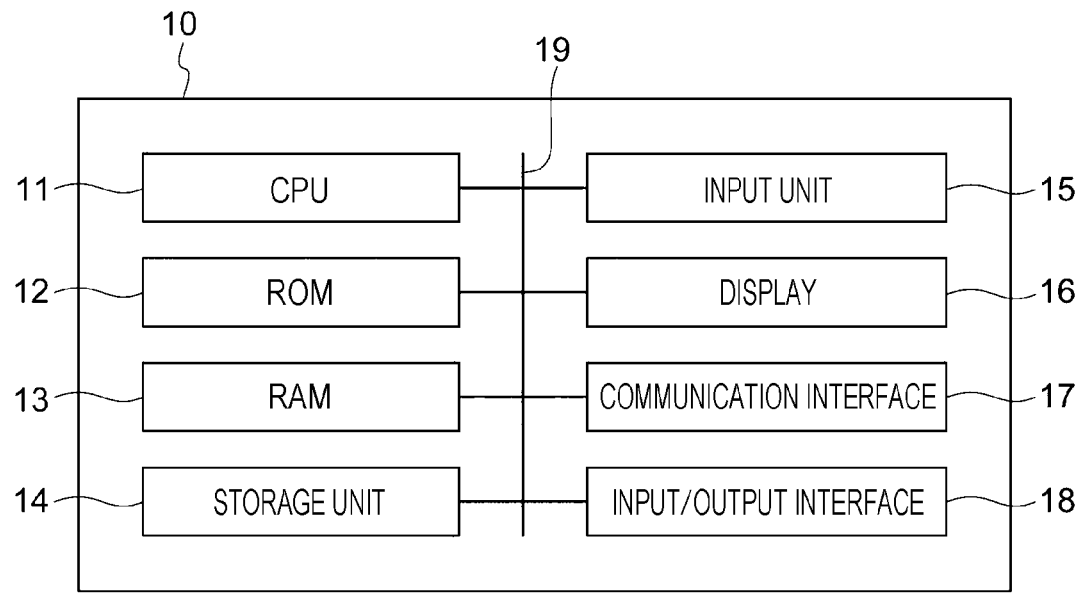
FIG. 2 is a block diagram depicting a hardware configuration of the information processing apparatus.

FIG. 2 is a block diagram depicting a hardware configuration of the user terminal 10.

As depicted in FIG. 2, the user terminal 10 includes a central processing unit (CPU) 11, a read-only memory (ROM) 12, a random-access memory (RAM) 13, a storage unit 14, the input unit 15, the display 16, a communication interface 17, and an input/output interface 18, as components. These components are communicatively connected to each other by using a bus 19.

The CPU 11, which is a central computing processing unit, executes various programs and controls each component. Specifically, the CPU 11 loads programs from the ROM 12 or the storage unit 14 and uses the RAM 13 as a working space to execute the programs. The CPU 11 controls each component described above and performs various kinds of computing processes in accordance with the programs recorded in the ROM 12 or the storage unit 14. In the present exemplary embodiment, an information processing program is stored in the ROM 12 or the storage unit 14.

The ROM 12 stores various programs and various kinds of data. The RAM 13 functions as a working space and temporarily retains programs or data. The storage unit 14 is formed by a hard disk drive (HDD) or a solid-state drive (SSD) and stores various programs including the operating system and various kinds of data. The storage unit 14 stores a printer-driver program. The CPU 11 loads the printer-driver program from the storage unit 14 and functions as a printer driver by executing the program.

The communication interface 17 is an interface for communicating with other apparatuses, and such a standard as Ethernet (registered trademark), fiber distributed data interface (FDDI), or Wi-Fi (registered trademark) is used. The user terminal 10 may communicate with the printer 30, for example, via the communication interface 17 and output an evaluation result to a display device of the printer 30.

The input/output interface 18 is used to receive a signal from other devices and output a signal to other devices. In the present exemplary embodiment, the sensor 20 is electrically connected to the user terminal 10 by using the input/output interface 18. A measurement information obtained by the sensor 20 is entered into the CPU 11 via the input/output interface 18.

The input unit 15 includes a pointing device, such as a mouse, and a keyboard and is used for receiving various kinds of input. The display 16 is, for example, a liquid crystal display and presents various kinds of information. The display 16 is an example of a display device. The display 16 may adopt a touch-panel system and may also function as the input unit 15.

Figure 3:
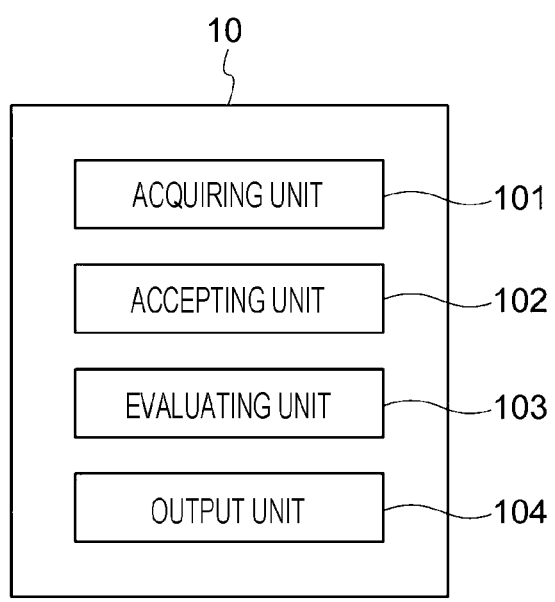
FIG. 3 is a block diagram depicting an example of a functional configuration of the information processing apparatus.

FIG. 3 is a block diagram depicting an example of a functional configuration of the user terminal 10.

As depicted in FIG. 3, the user terminal 10 includes an acquiring unit 101, an accepting unit 102, an evaluating unit 103, and an output unit 104 as functional components. Each functional component is provided by the CPU 11, which reads a print-setting add-on program stored in the ROM 12 or the storage unit 14 and loads the print-setting add-on program onto the RAM 13 to execute the program.

The acquiring unit 101 acquires physical-property-value information of the recording medium P. For example, the acquiring unit 101 converts a measurement value obtained by the sensor 20 for a physical property of the recording medium P into a physical-property value of the recording medium P and thereby acquires physical-property-value information of the recording medium P. As depicted in FIG. 4A, printing performance indicators of the recording medium P include the transport property, the transfer property, and the fixing property. The acquiring unit 101 acquires physical-property-value information of the recording medium P with respect to each printing performance indicator. For example, the physical-property-value information of the recording medium P with respect to the transport property as one of the printing performance indicators include a basis weight, a thickness, smoothness, bending stiffness, a friction coefficient, and an electric resistance. Further, as depicted in FIG. 4B, physical-property-value information of the recording medium P may be acquired not only for the case where printing is performed by the printer 30 on the recording medium P but also for the case where post processing is performed by a post-processing machine on the recording medium P after printing is performed. In such a case, physical-property-value information of the recording medium P may be acquired with respect to a performance indicator for post processing. Examples of post processing include punching a hole through the recording medium P in addition to stapling multiple recording media P together (refer to FIG. 4B).

If the sensor 20 is not electrically connected to the user terminal 10, measurement information obtained by the sensor 20 may be received by the receiver of the user terminal 10 via the communication interface 17 (refer to FIG. 2) by using a wireless communication device. In this case, the acquiring unit 101 acquires physical-property-value information of the recording medium P via the receiver.

In addition, the brand name of the recording medium P may be entered into the input unit 15 of the user terminal 10. In this way, the acquiring unit 101 accepts input information regarding the brand name of the recording medium P and acquires physical-property-value information of the recording medium P in accordance with the input information regarding the brand name of the recording medium P.

The accepting unit 102 accepts information regarding the printer 30. The information regarding the printer 30 includes model information of the printer 30 and information to individually identify the printer 30 (for example, a serial number). For example, the model information of the printer 30 is accepted in response to the model of the printer 30 being entered into the input unit 15. Further, for example, the information regarding the printer 30 may be accepted in response to the information to individually identify the printer 30 (for example, a serial number) being entered into the input unit 15.

Using the information regarding the printer 30, the evaluating unit 103 performs an evaluation as to whether there is a possibility that the recording medium P causes trouble for printing by the printer 30, the evaluation being performed with respect to at least one printing performance indicator based on the physical-property-value information of the recording medium P. Examples of possible "trouble for printing" include trouble for transporting the recording medium P, that is, trouble resulting from a problem with the transport property, and trouble related to the print quality of the recording medium P, that is, trouble resulting from a problem with the transfer property or with the fixing property. Examples of the trouble resulting from a problem with the transport property include the inability to feed the recording medium P through a printing machine, the mismatch between the sizes of the recording medium P and a printing machine, and a jam caused by feeding the recording medium P through a printing machine. The trouble related to the print quality concerns a possibility that an image quality may be degraded on the recording medium P, which can be fed into a printing machine, and examples of the trouble resulting from a problem with the transfer property include unevenness in an image quality, color misregistration, a faded image, and a void in an image. Further, examples of the trouble resulting from a problem with the fixing property include unevenness in glossiness and blurring caused by an inkjet recording system.

Using the information regarding the printer 30 accepted by the accepting unit 102, the evaluating unit 103 performs an evaluation of the recording medium P. The evaluating unit 103 may perform an evaluation as to whether there is a possibility that the recording medium P causes trouble for printing by the printer 30, the evaluation being performed with respect to two or more printing performance indicators. For example, with respect to two or more of the printing performance indicators, which are the transport property, the transfer property, and the fixing property depicted in FIG. 4A, the evaluating unit 103 may perform an evaluation as to whether there is a possibility that the recording medium P causes trouble for printing by the printer 30.

As depicted in FIG. 5, for example, the ROM 12 or the storage unit 14 stores a table specifying for each model of the printers 30 evaluation thresholds with respect to the printing performance indicators of the recording medium P. Based on the evaluation thresholds, the evaluating unit 103 performs an evaluation as to whether there is a possibility that the recording medium P causes trouble for printing by the printer 30.

The table depicted in FIG. 5 specifies upper and lower forbidding thresholds in accordance with the information regarding the printer 30 (for example, the model information). For example, the evaluating unit 103 determines whether to forbid printing on the recording medium P by using the upper and lower forbidding thresholds. For example, as depicted in FIG. 6, if a physical-property value of the recording medium P is smaller than the lower forbidding threshold or if a physical-property value of the recording medium P is larger than the upper forbidding threshold, the evaluating unit 103 grades the recording medium P as an unusable recording medium for which printing is forbidden (in the present exemplary embodiment, denoted by C: unusable sheet).

The table depicted in FIG. 5 also specifies upper and lower restriction thresholds in accordance with the information regarding the printer 30 (for example, the model information). The upper restriction threshold is smaller than the upper forbidding threshold, and the lower restriction threshold is larger than the lower forbidding threshold. For example, the evaluating unit 103 uses the upper and lower restriction thresholds to determine whether to restrict printing on the recording medium P. For example, as depicted in FIG. 6, if a physical-property value of the recording medium P is in the range of the lower forbidding threshold to the lower restriction threshold or if a physical-property value of the recording medium P is in the range of the upper restriction threshold to the upper forbidding threshold, the evaluating unit 103 grades the recording medium P as a conditionally usable recording medium for which printing is subject to restriction (in the present exemplary embodiment, denoted by B: conditionally usable sheet). If there is no forbidding threshold and a physical-property value of the recording medium P is smaller than the lower restriction threshold or larger than the upper restriction threshold, the evaluating unit 103 grades the recording medium P as a conditionally usable recording medium for which printing is subject to restriction (in the present exemplary embodiment, denoted by B: conditionally usable sheet).

The output unit 104 outputs an evaluation result obtained by the evaluating unit 103 to the display 16. The output unit 104 outputs an evaluation result obtained by the evaluating unit 103 to the display 16 separately for each printing performance indicator (that is, the transport property, the transfer property, the fixing property, and other properties). The output unit 104 may also output an evaluation result obtained by the evaluating unit 103 to the display 16 separately for each model of the printers 30, the model being accepted by the accepting unit 102.

Further, the output unit 104 may output as an evaluation result at least one of the two types of information, which are forbidding information to forbid printing by the printer 30 on the recording medium P and restriction information to restrict the use of the recording medium P for the printer 30. The term "forbidding information" indicates information to forbid the use of the recording medium P for the printer 30, that is, information to forbid feeding the recording medium P through the printer 30. The term "restriction information" indicates information to restrict the use of the recording medium P for the printer 30, for example, information indicating a possibility that the image quality is degraded upon printing on the recording medium P by the printer 30. In the present exemplary embodiment, the output unit 104 outputs as evaluation results both the forbidding information to forbid printing by the printer 30 on the recording medium P and the restriction information to restrict the use of the recording medium P for the printer 30. For example, if printing on the recording medium P by the printer 30 is subject to restriction, the display 16 presents a symbol representing a conditionally usable recording medium (in the present exemplary embodiment, B: conditionally usable sheet, refer to FIG. 13). Further, if printing on the recording medium P by the printer 30 is forbidden, the display 16 presents a symbol representing an unusable recording medium (in the present exemplary embodiment, C: unusable sheet, refer to FIG. 12).

In addition, as depicted in FIG. 6, the output unit 104 may output a more specific message as forbidding information or restriction information regarding the recording medium P to enable a user to determine, with respect to each printing performance indicator, whether the recording medium P is usable. If multiple evaluations are involved, multiple messages may be presented, or a solution may be presented.

The output unit 104 may also output an evaluation result obtained by the evaluating unit 103 to the display device of the printer 30 via the communication interface 17.

Next, an operation according to the present exemplary embodiment will be described.

Figure 7:
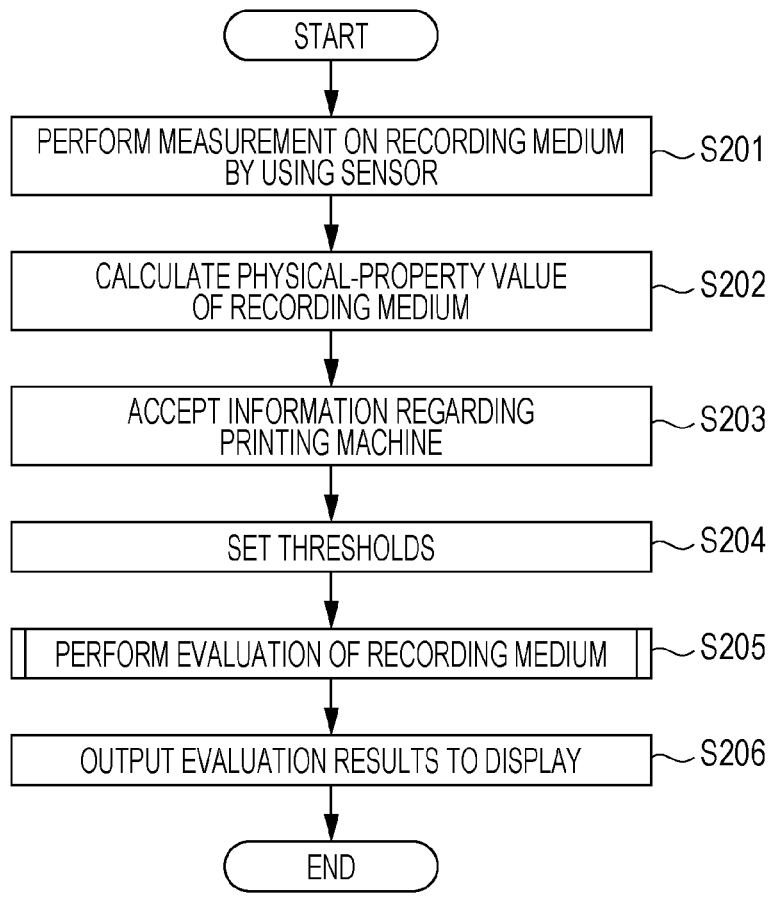
FIG. 7 is a flowchart depicting a process flow of the information processing apparatus according to the first exemplary embodiment.

FIG. 7 is a flowchart depicting a flow of information processing performed by using the user terminal 10 according to the present exemplary embodiment. In the user terminal 10, the CPU 11 reads the information processing program stored in the ROM 12 or the storage unit 14 and loads the information processing program onto the RAM 13 to execute the program, and then information processing is performed. In the present exemplary embodiment, a sheet is used as an example of the recording medium P. Thus, the recording medium P is sometimes referred to as a sheet in the description and in messages presented by the display 16.

As depicted in FIG. 7, once a user sets the recording medium P on the sensor 20, the CPU 11 performs a measurement on the recording medium P by using the sensor 20 (step S201).

The CPU 11 calculates a physical-property value of the recording medium P based on a measurement value obtained by the sensor 20 for the recording medium P (step S202). For example, the CPU 11 converts the measurement value obtained by the sensor 20 into a physical-property value of the recording medium P. In this way, the CPU 11 acquires physical-property-value information of the recording medium P.

Figure 10:
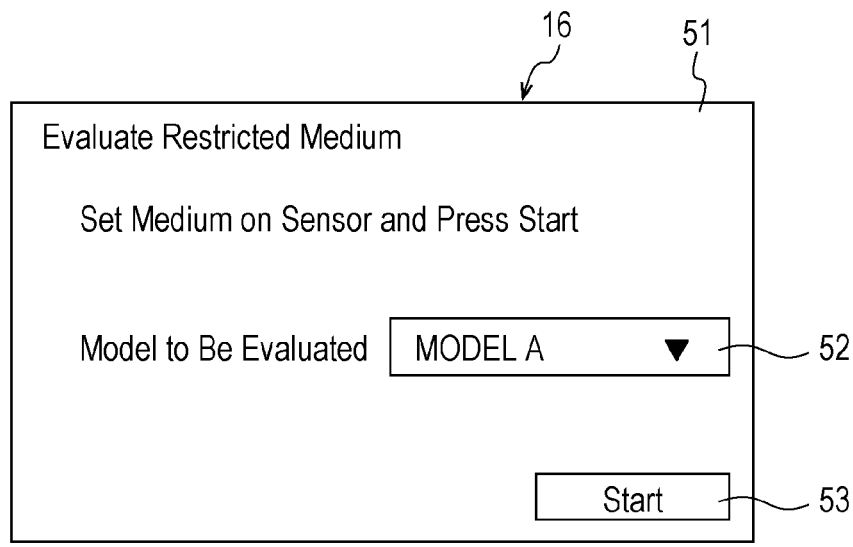
FIG. 10 is an illustration depicting an example of an input screen for entering the model of a printing machine, and the input screen is presented by a display device of the information processing apparatus according to the first exemplary embodiment.

The CPU 11 accepts information regarding the printer 30, the printer 30 being an example of a printing machine (step S203). For example, as depicted in FIG. 10, the display 16 of the user terminal 10 presents a display screen 51 on which to enter or select a model of the printer 30 and start a measurement on the recording medium P (that is, a medium) by the sensor 20. The user uses an input section 52 of the display screen 51 to enter or select a model of the printer 30 (for example, model A) and presses a start button 53. In this way, the CPU 11 starts to measure a physical property of the recording medium P by using the sensor 20 and accepts information regarding the printer 30 (in the present exemplary embodiment, model information).

The CPU 11 sets thresholds in accordance with the information regarding the printer 30 (Step S204). For example, the CPU 11 reads a table (refer to FIG. 5) stored in the ROM 12 or the storage unit 14 and sets thresholds corresponding to the model of the printer 30 (for example, model A).

The CPU 11 performs an evaluation as to whether there is a possibility that the recording medium P causes trouble for printing by the printer 30 (step S205). In the present exemplary embodiment, the CPU 11 performs an evaluation as to whether there is a possibility that the recording medium P causes trouble for printing by the printer 30, and the evaluation is performed with respect to a printing performance indicator based on the physical-property-value information of the recording medium P. Evaluation of the recording medium P will be described below.

The CPU 11 outputs evaluation results of the recording medium P to the display 16 (step S206). In the present exemplary embodiment, the CPU 11 outputs an evaluation result of the recording medium P to the display 16 separately for each printing performance indicator. Presenting an evaluation result of the recording medium P will be described below. This operation concludes a process based on the information processing program.

Figure 8:
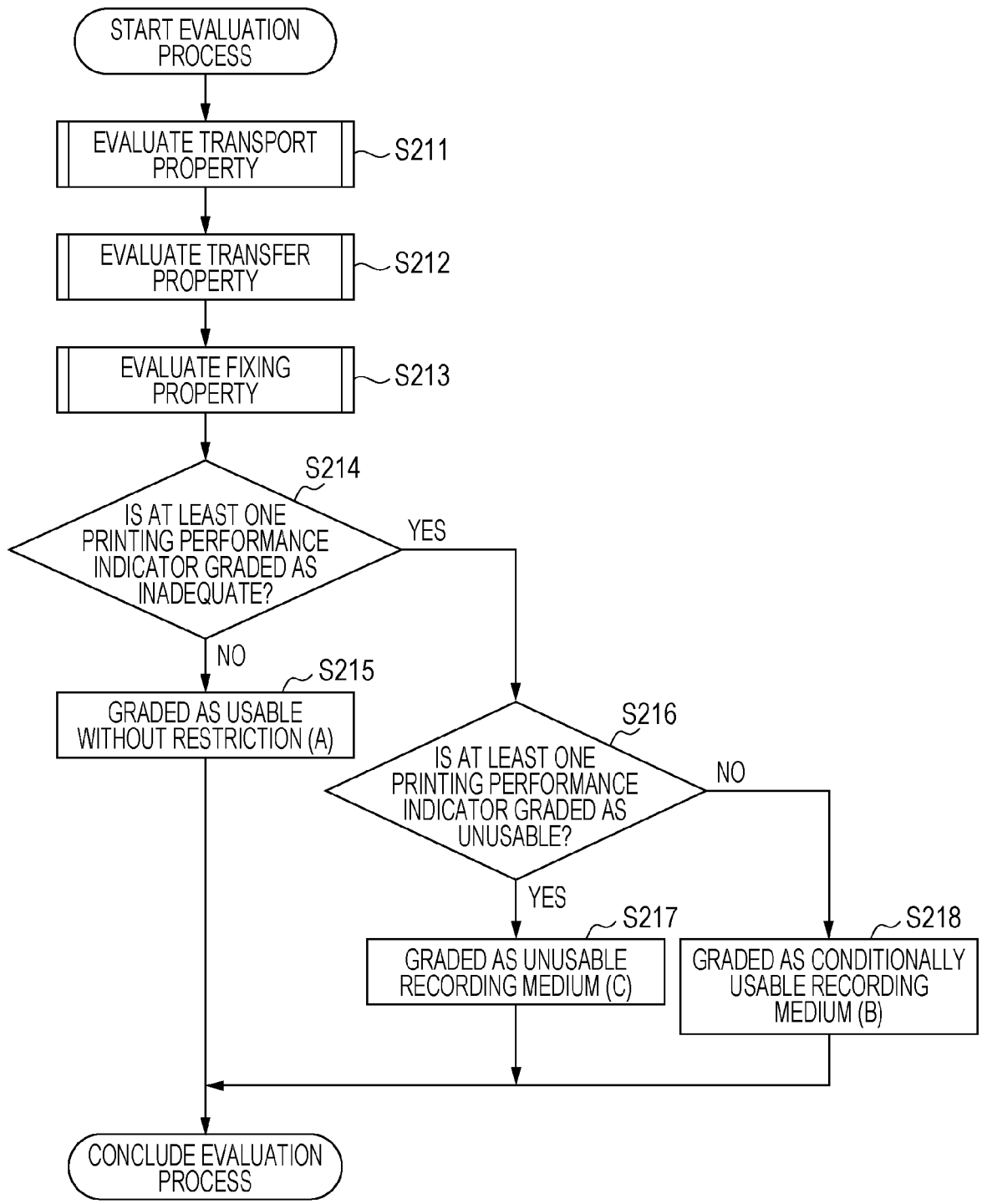
FIG. 8 is a flowchart depicting a flow of an evaluation process for a recording medium for the information processing apparatus according to the first exemplary embodiment.

FIG. 8 is a flowchart depicting a flow of an evaluation process performed by using the user terminal 10.

As depicted in FIG. 8, once an evaluation process for the recording medium P starts, the CPU 11 evaluates the transport property as one of the printing performance indicators of the recording medium P (step S211). In this way, the CPU 11 performs an evaluation as to whether there is a possibility that the recording medium P causes trouble for printing by the printer 30, and the evaluation is performed with respect to the transport property. Evaluating the transport property will be described below.

The CPU 11 evaluates the transfer property as one of the printing performance indicators of the recording medium P (step S212). In this way, the CPU 11 performs an evaluation as to whether there is a possibility that the recording medium P causes trouble for printing by the printer 30, and the evaluation is performed with respect to the transfer property.

The CPU 11 evaluates the fixing property as one of the printing performance indicators of the recording medium P (step S213). In this way, the CPU 11 performs an evaluation as to whether there is a possibility that the recording medium P causes trouble for printing by the printer 30, and the evaluation is performed with respect to the fixing property.

The CPU 11 determines whether at least one of the printing performance indicators is graded as inadequate (step S214). In other words, the CPU 11 determines whether it is determined, with respect to at least one of the printing performance indicators, that there is a possibility that the recording medium P causes trouble for printing by the printer 30.

Figure 11:
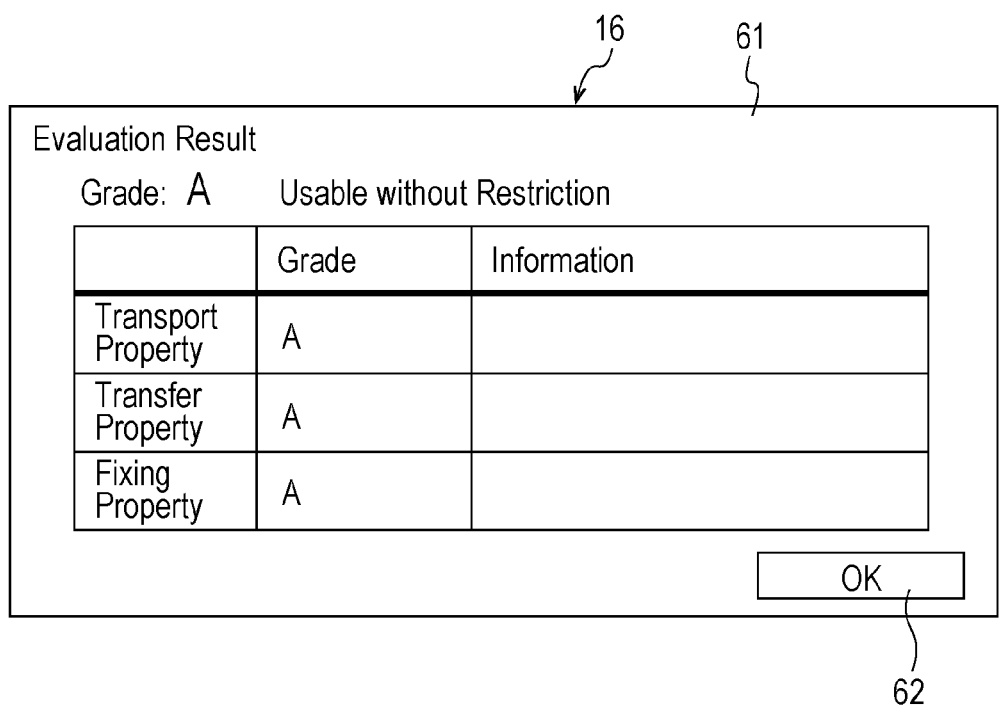
FIG. 11 is an illustration depicting a first example of an evaluation result indicating that a recording medium is usable without restriction, and the evaluation result is presented by the display device of the information processing apparatus according to the first exemplary embodiment.

If it is determined that none of the printing performance indicators is graded as inadequate (NO in step S214), the recording medium P is graded by the CPU 11 as usable without restriction (A) (step S215). This operation concludes the evaluation process. The CPU 11 performs the process of step S206, which is described above, and outputs the evaluation results to the display 16. For example, as depicted in FIG. 11, the display 16 of the user terminal 10 presents a display screen 61 for the evaluation results. The display screen 61 presents the transport property, the transfer property, and the fixing property of the printing performance indicators graded as usable (A). Further, above the evaluation result with respect to each of the printing performance indicators, the display screen 61 presents an evaluation result representing a usable grade (A), the evaluation result indicating that the recording medium P is usable without restriction. If the user presses an OK button 62 in the display screen 61, the presentation of the display screen 61 ends.

If it is determined that at least one of the printing performance indicators is graded as inadequate (YES in step S214), the CPU 11 determines whether the at least one of the printing performance indicators of the recording medium P is graded as unusable (step S216). If one of the printing performance indicators is graded as inadequate, either the recording medium P is unusable for the printer 30 (that is, printing on the recording medium P by using the printer 30 is forbidden) or the recording medium P is usable for the printer 30 but a degraded image quality or other degradation is expected (that is, printing on the recording medium P by using the printer 30 is subject to restriction). If the recording medium P is unusable, printing on the recording medium P by using the printer 30 is forbidden.

If it is determined that one of the printing performance indicators of the recording medium P is graded as unusable (YES in step S216), the recording medium P is graded by the CPU 11 as an unusable recording medium (C) (step S217). This operation concludes the evaluation process. The CPU 11 performs the process of step S206, which is described above, and outputs the evaluation results to the display 16. For example, as depicted in FIG. 12, the display 16 of the user terminal 10 presents a display screen 63 for the evaluation results. The display screen 63 presents the transport property of the printing performance indicators graded as unusable (C). This evaluation result indicates that the recording medium P cannot be transported. The display screen 63 presents the transfer property and the fixing property graded as usable (A). Further, above the evaluation result with respect to each of the printing performance indicators, the display screen 63 presents an evaluation result representing an unusable recording medium (unusable sheet: C), the evaluation result indicating that the recording medium P is unusable. If the user presses the OK button 62 in the display screen 63, the presentation of the display screen 63 ends.

Further, for example, as depicted in FIG. 14, if it is determined that at least one of the printing performance indicators of the recording medium P is graded as unusable (C), the display 16 of the user terminal 10 presents a display screen 65 for an evaluation result representing an unusable recording medium (unusable sheet: C). The display screen 65 presents the transport property of the printing performance indicators graded as unusable (C). This evaluation result indicates that the recording medium P cannot be transported. The display screen 65 also presents the transfer property graded as a conditionally usable recording medium (B) and the fixing property graded as usable (A). Further, above the evaluation result with respect to each of the printing performance indicators, the display screen 65 presents an evaluation result representing an unusable recording medium (unusable sheet: C), the evaluation result indicating that the recording medium P is unusable. If the user presses the OK button 62 in the display screen 65, the presentation of the display screen 65 ends.

If it is determined that none of the printing performance indicators of the recording medium P is graded as unusable (NO in step S216), the recording medium P is graded by the CPU 11 as a conditionally usable recording medium (B) (step S218). This operation concludes the evaluation process. The CPU 11 performs the process of step S206, which is described above, and outputs the evaluation results to the display 16. For example, as depicted in FIG. 13, the display 16 of the user terminal 10 presents a display screen 64 for the evaluation results. The display screen 64 presents the transfer property of the printing performance indicators graded as conditionally usable (B). This evaluation result indicates that there is a possibility that the recording medium P causes the degradation of the image quality. The display screen 64 presents the transport property and the fixing property graded as usable (A). Further, above the evaluation result with respect to each of the printing performance indicators, the display screen 64 presents an evaluation result representing a conditionally usable recording medium (B), the evaluation result indicating that the use of the recording medium P is subject to restriction. If the user presses the OK button 62 in the display screen 64, the presentation of the display screen 64 ends. This operation concludes the evaluation process.

For example, as depicted in FIG. 15, the display 16 of the user terminal 10 sometimes presents a display screen 66 having multiple printing performance indicators graded as conditionally usable (B). For example, the display screen 66 presents the transport property and the transfer property graded as conditionally usable (B). If the user presses the OK button 62 in the display screen 66, the presentation of the display screen 66 ends.

Figure 9:
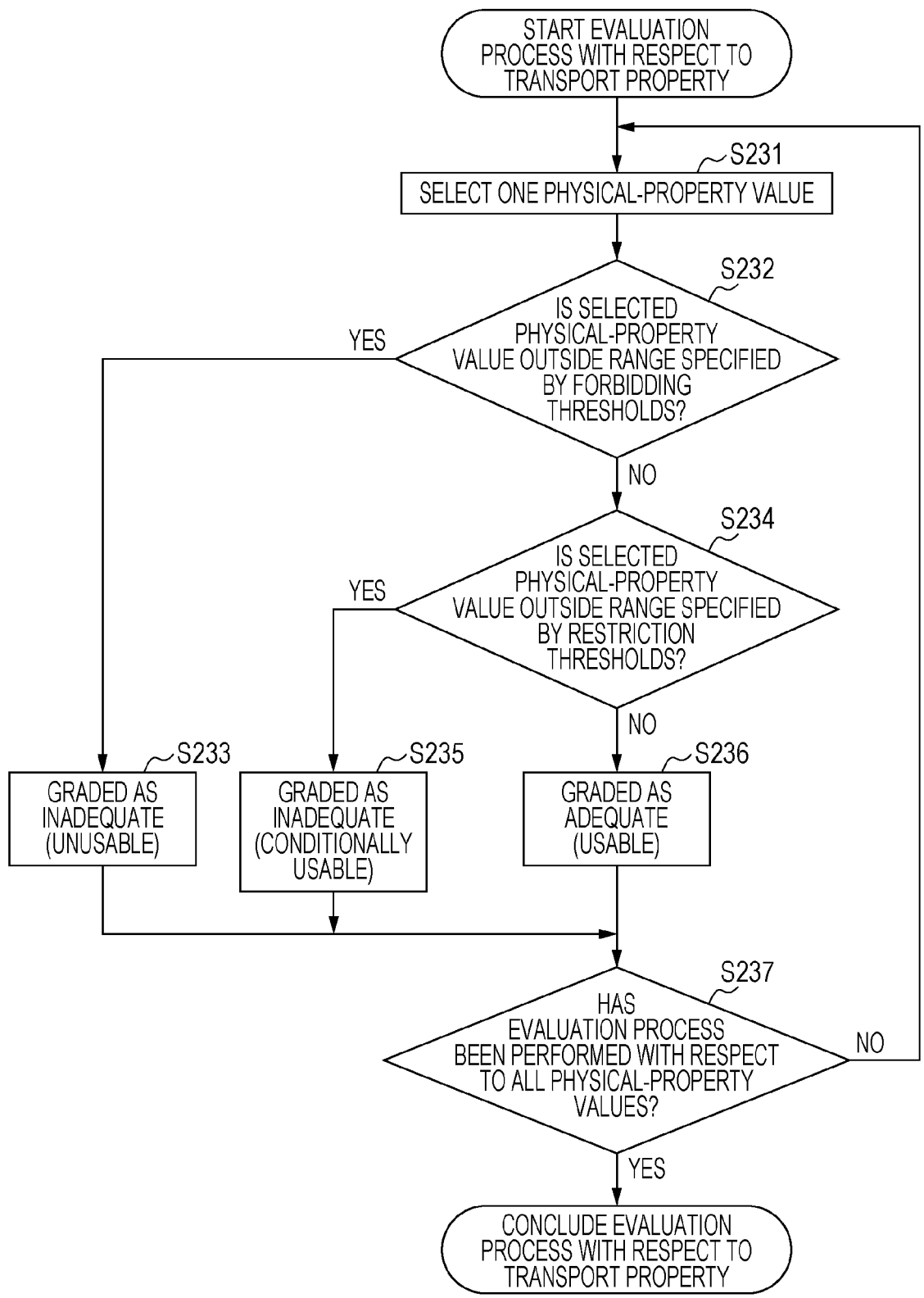
FIG. 9 is a flowchart depicting a flow of an evaluation process with respect to the transport property of a recording medium for the information processing apparatus according to the first exemplary embodiment.

FIG. 9 is a flowchart depicting a flow of an evaluation process performed by using the user terminal 10 with respect to the transport property.

Once an evaluation process with respect to the transport property of the recording medium P starts in step S211, which is described above, the CPU 11 selects a physical-property value of the recording medium P (step S231).

The CPU 11 determines whether the selected physical-property value of the recording medium P is outside the range specified by the upper and lower forbidding thresholds (step S232). The CPU 11 uses, for example, the table depicted in FIG. 5 and determines whether the selected physical-property value of the recording medium P is smaller than the lower forbidding threshold. If the selected physical-property value of the recording medium P is smaller than the lower forbidding threshold, the CPU 11 determines that the selected physical-property value of the recording medium P is outside the range specified by the upper and lower forbidding thresholds. Further, the CPU 11 uses, for example, the table depicted in FIG. 5 and determines whether the selected physical-property value of the recording medium P is larger than the upper forbidding threshold. If the selected physical-property value of the recording medium P is larger than the upper forbidding threshold, the CPU 11 determines that the selected physical-property value of the recording medium P is outside the range specified by the upper and lower forbidding thresholds.

If the selected physical-property value of the recording medium P is outside the range specified by the upper and lower forbidding thresholds (YES in step S232), the CPU 11 determines that the use of the recording medium P is inadequate (the recording medium P graded as unusable) (step S233).

If the selected physical-property value of the recording medium P is not outside the range specified by the upper and lower forbidding thresholds (NO in step S232), the CPU 11 determines whether the selected physical-property value of the recording medium P is outside the range specified by the upper and lower restriction thresholds (step S234). The CPU 11 uses, for example, the table depicted in FIG. 5 and determines whether the selected physical-property value of the recording medium P is in the range of the lower forbidding threshold to the lower restriction threshold. If the selected physical-property value of the recording medium P is in the range of the lower forbidding threshold to the lower restriction threshold, the CPU 11 determines that the selected physical-property value of the recording medium P is outside the range specified by the upper and lower restriction thresholds. Further, the CPU 11 uses, for example, the table depicted in FIG. 5 and determines whether the selected physical-property value of the recording medium P is in the range of the upper restriction threshold to the upper forbidding threshold. If the selected physical-property value of the recording medium P is in the range of the upper restriction threshold to the upper forbidding threshold, the CPU 11 determines that the selected physical-property value of the recording medium P is outside the range specified by the upper and lower restriction thresholds.

If the selected physical-property value of the recording medium P is outside the range specified by the upper and lower restriction thresholds (YES in step S234), the CPU 11 determines that the use of the recording medium P is inadequate (the recording medium P graded as conditionally usable) (step S235).

If the selected physical-property value of the recording medium P is not outside the range specified by the upper and lower restriction thresholds (NO in step S234), the CPU 11 determines that the use of the recording medium P is adequate (that is, the recording medium P graded as usable) (step S236).

The CPU 11 determines whether an evaluation process has been performed with respect to all the physical-property values of the recording medium P (step S237).

If it is determined that an evaluation process has not been performed with respect to at least one of the physical-property values of the recording medium P (NO in step S237), the CPU 11 returns to the process of step S231.

If it is determined that an evaluation process has been performed with respect to all the physical-property values of the recording medium P (YES in step S237), the CPU 11 concludes the evaluation process with respect to the transport property. An evaluation process with respect to the transfer property and an evaluation process with respect to the fixing property are performed by the CPU 11 similarly to the evaluation process with respect to the transport property, which is depicted in FIG. 9.

The user terminal 10, which is described above, can provide information that enables the user to determine whether the recording medium P is usable. The user can make such a determination with respect to each performance indicator of the printer 30 even without setting information of existing recording media P, as compared with the case where physical-property-value information of a recording medium and the type information of existing recording media are used to perform an evaluation as to whether the recording medium is usable for printing by a predetermined printing machine.

Further, the user terminal 10 converts a measurement value obtained by the sensor 20 into a physical-property value of the recording medium P and thereby acquires physical-property-value information of the recording medium P. Thus, based on differences between individual recording media P, the user terminal 10 can perform an evaluation as to whether there is a possibility that the recording medium P causes trouble for printing.

The user terminal 10 accepts model information of the printer 30. Thus, the user terminal 10 enables a determination as to whether the recording medium P is usable with respect to each performance indicator of multiple printers 30.

Further, with respect to two or more printing performance indicators, the user terminal 10 performs an evaluation as to whether there is a possibility that the recording medium P causes trouble for printing by the printer 30. Thus, in contrast to the case of presenting information regarding whether there is a possibility that a recording medium causes trouble for printing with respect to one printing performance indicator, the user terminal 10 enables a determination as to whether the recording medium P is usable with respect to each printing performance indicator.

The user terminal 10 sets evaluation thresholds with respect to printing performance indicators for each model of the printers 30 in accordance with the information regarding the printers 30 and performs an evaluation as to whether there is a possibility that the recording medium P causes trouble for printing. Thus, in contrast to the case of using similar evaluation thresholds for each model of printing machines to perform an evaluation as to whether there is a possibility that a recording medium causes trouble for printing, the user terminal 10 enables an appropriate determination as to whether the recording medium P is usable for each model of the printers 30.

In the user terminal 10, the display 16 is electrically connected to the CPU 11. Thus, the user, who operates the user terminal 10, can determine whether the recording medium P is usable by using the display 16 of the user terminal 10.

The user terminal 10 outputs as an evaluation result at least one of the two types of information, which are the forbidding information to forbid printing by the printer 30 on the recording medium P and the restriction information to restrict the use of the recording medium P for the printer 30. Thus, in contrast to the case of outputting only the forbidding information as an evaluation result, the user terminal 10 enables the user to determine in accordance with the restriction information whether the recording medium P is usable.

Using upper and lower forbidding thresholds that are set in accordance with information regarding the printer 30, the user terminal 10 determines whether to forbid printing on the recording medium P. Further, using upper and lower restriction thresholds that are set in accordance with information regarding the printer 30, the user terminal 10 determines whether to restrict printing on the recording medium P. The upper restriction threshold is smaller than the upper forbidding threshold, and the lower restriction threshold is larger than the lower forbidding threshold. Thus, by using the user terminal 10, the user can determine whether the recording medium P is usable in accordance with the restriction information, which restricts printing on the recording medium P.

The information processing program stored in the user terminal 10 can provide information that enables the user to determine whether the recording medium P is usable. The user can make such a determination with respect to each performance indicator of the printer 30 even without setting information of existing recording media P, as compared with the case where physical-property-value information of a recording medium and the type information of existing recording media are used to perform an evaluation as to whether the recording medium is usable for printing by a predetermined printing machine.

As depicted in FIG. 16, evaluation thresholds used to determine whether the recording medium P is usable for the printer 30 are sometimes determined in conjunction with other physical-property values of the recording medium P, such as the type of the recording medium P. Thus, an upper threshold and a lower threshold may be set for each of the two or more characteristics of the recording medium P (for example, coated paper and uncoated paper).

Second Exemplary Embodiment

Next, an information processing apparatus according to a second exemplary embodiment will be described. The same numbers are attached to elements that are the same as or similar to the elements in the first exemplary embodiment, which is described above, and descriptions regarding such elements will be omitted.

In the first exemplary embodiment, as an example, a description has been given of the user terminal 10 that is not electrically connected to the printer 30 in the information processing system 1, which is depicted in FIG. 1. In the second exemplary embodiment, a user terminal 10 that is electrically connected to a printer 30 will be described as an example. In the second exemplary embodiment, when a "stock" (that is, the profile of a recording medium P) is created, it is determined whether the recording medium P is usable. The profile of the recording medium P indicates recording-medium settings for printing. Unless the basis weight, the type of paper, and other parameters are appropriately determined for each recording medium P, there is a possibility that the printer 30 may cause the recording medium P to be stuck (cause a jam) or an image quality to be degraded. Thus, the profile of the recording medium P is created.

Figure 17:
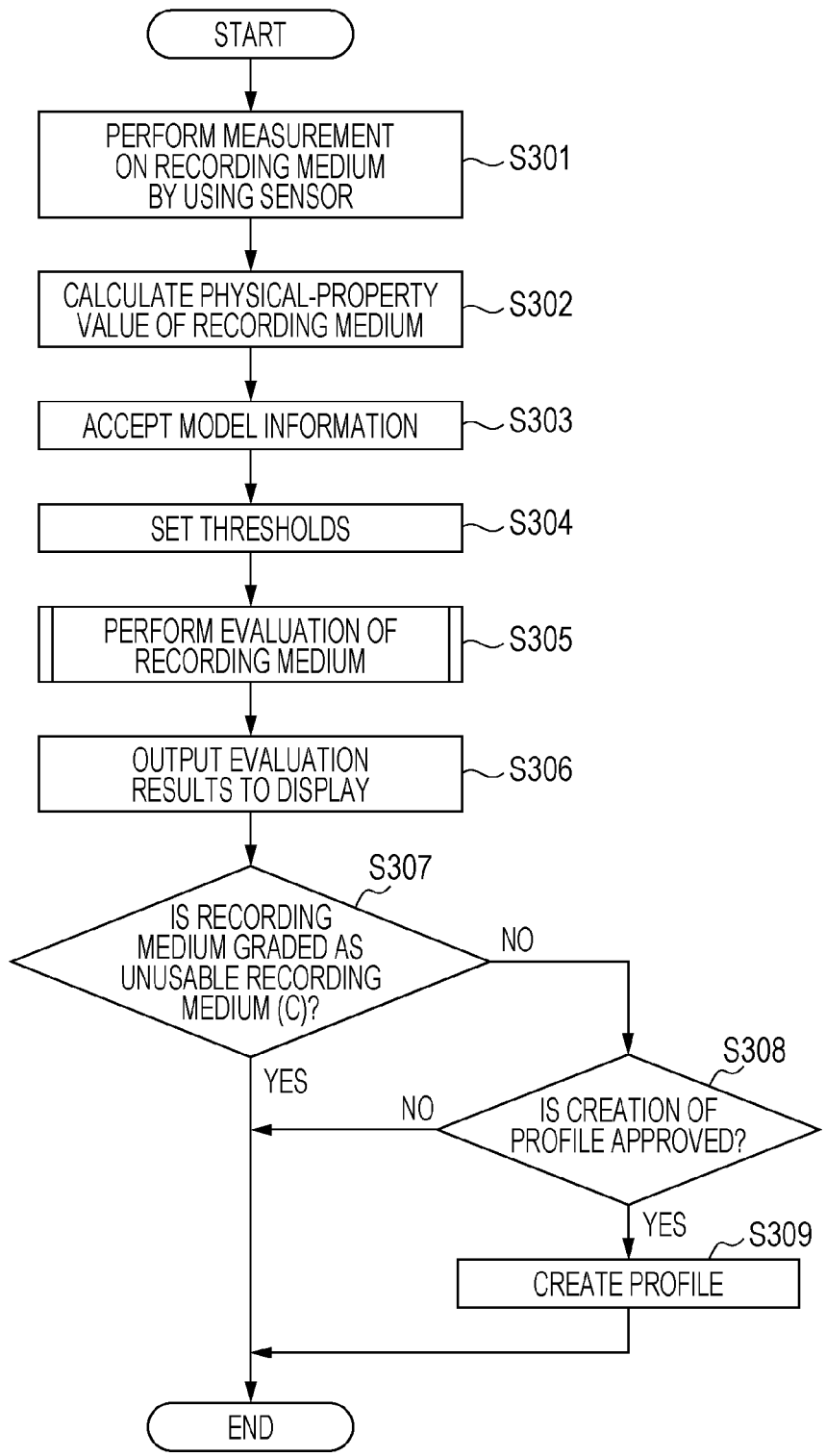
FIG. 17 is a flowchart depicting a process flow of an information processing apparatus according to a second exemplary embodiment.

FIG. 17 is a flowchart depicting a flow of information processing performed by using the user terminal 10 according to the second exemplary embodiment.

As depicted in FIG. 17, once a user sets the recording medium P on a sensor 20, a CPU 11 performs a measurement on the recording medium P by using the sensor 20 (step S301).

The CPU 11 calculates a physical-property value of the recording medium P based on a measurement value obtained by the sensor 20 for the recording medium P (step S302).

The CPU 11 accepts model information of the printer 30 (step S303). Since the user terminal 10 is electrically connected to the printer 30 in the second exemplary embodiment, the model information of the printer 30 is entered into the CPU 11.

The CPU 11 sets thresholds in accordance with the model information of the printer 30 (step S304).

The CPU 11 performs an evaluation as to whether there is a possibility that the recording medium P causes trouble for printing by the printer 30 (step S305). The evaluation process is similar to the evaluation process described based on the flowcharts depicted in FIGS. 8 and 9.

The CPU 11 outputs evaluation results of the recording medium P to a display 16 (step S306).

The CPU 11 determines whether the recording medium P is graded as an unusable recording medium (C) (step S307).

If the recording medium P is not graded as an unusable recording medium (C) (NO in step S307), the CPU 11 determines whether the creation of the profile of the recording medium P is approved (step S308). The approval for the creation of the profile of the recording medium P indicates that the creation of the profile of the recording medium P is allowed.

Figure 18:
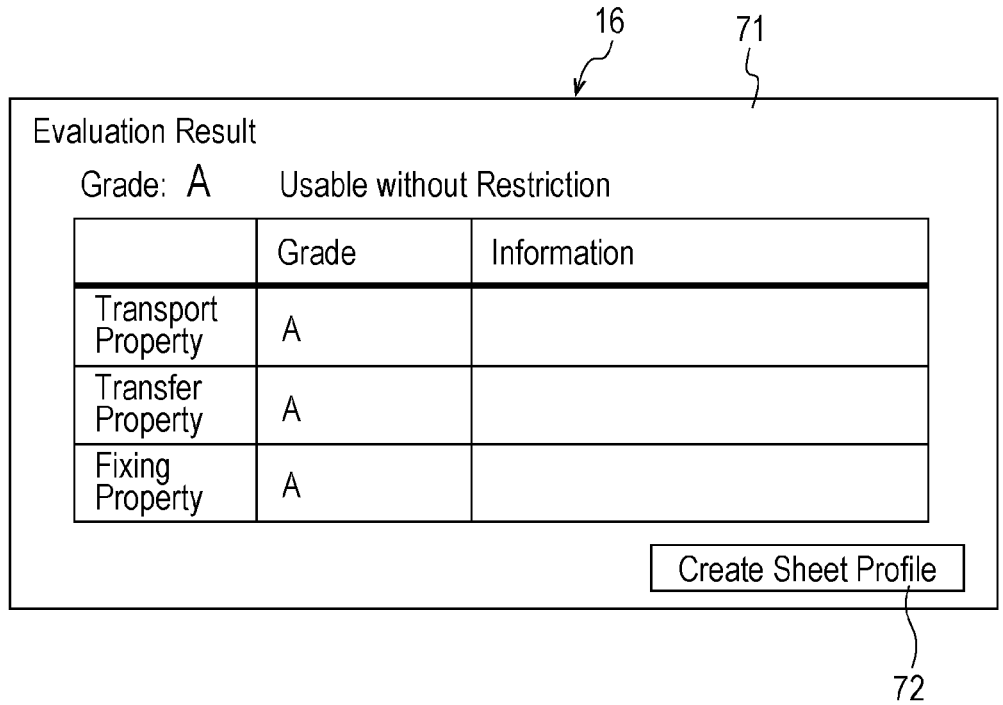
FIG. 18 is an illustration depicting a first example of an evaluation result indicating that a recording medium is usable without restriction, and the evaluation result is presented by a display device of the information processing apparatus according to the second exemplary embodiment.

If the creation of the profile of the recording medium P is approved (YES in step S308), the CPU 11 creates the profile of the recording medium P (step S309). For example, as depicted in FIG. 18, the display 16 of the user terminal 10 presents a display screen 71 having the evaluation results and a creation button 72 used to create the profile of the recording medium P. For example, the display screen 71 presents all the printing performance indicators graded as usable (grade: A). In response to the creation button 72, which is labeled "Create Sheet Profile", being pressed in the display screen 71, the profile of the recording medium P is created.

Figure 20:
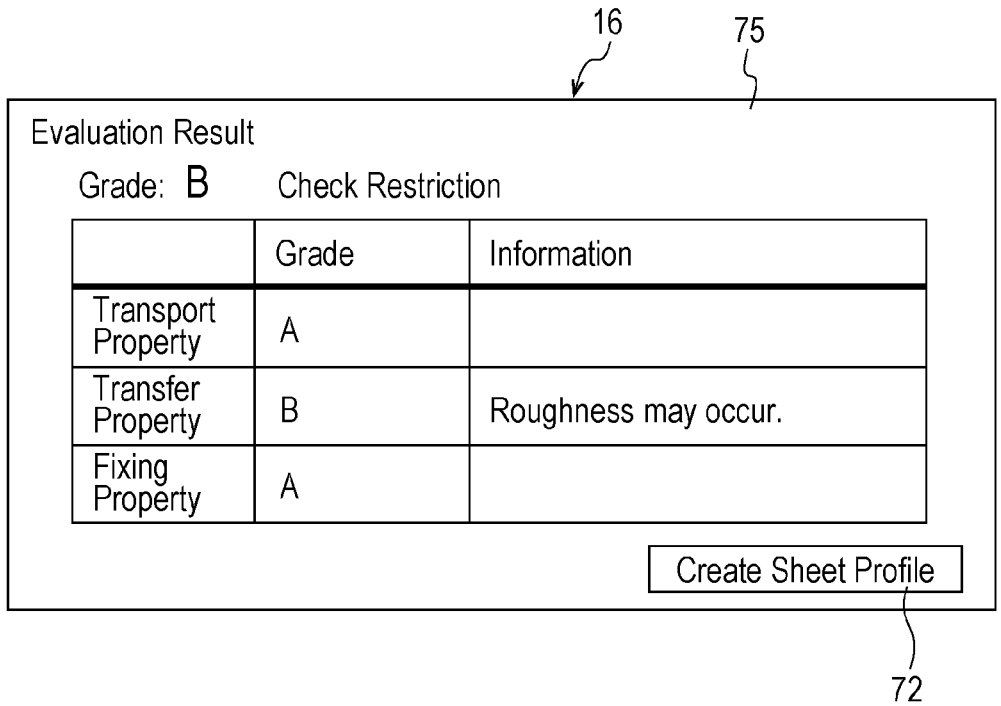
FIG. 20 is an illustration depicting a third example of an evaluation result indicating that the use of a recording medium is subject to restriction, and the evaluation result is presented by the display device of the information processing apparatus according to the second exemplary embodiment.

Further, for example, as depicted in FIG. 20, the display 16 of the user terminal 10 presents a display screen 75 having the evaluation results and the creation button 72 used to create the profile of the recording medium P. For example, the display screen 75 presents one of the printing performance indicators (for example, the transfer property) graded as conditionally usable (grade: B). The profile of the recording medium P can be created in the case where only the degradation of an image quality, such as the degradation of the transfer property, is anticipated (refer to the column labeled "PROFILE CREATION" depicted in FIG. 6).

If the creation of the profile of the recording medium P is not approved (NO in step S308), the CPU 11 concludes the process based on an information processing program. Instead of concluding the process, the CPU 11 may wait until the creation of the profile of the recording medium P is approved.

Figure 19:
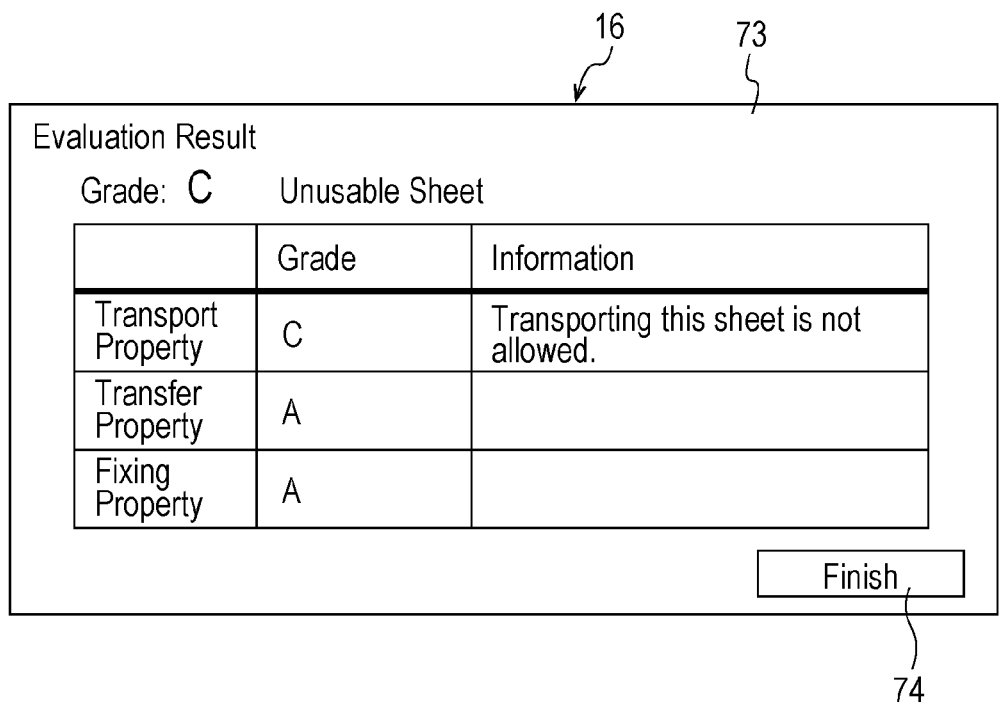
FIG. 19 is an illustration depicting a second example of an evaluation result indicating that the use of a recording medium is forbidden, and the evaluation result is presented by the display device of the information processing apparatus according to the second exemplary embodiment.

If the recording medium P is graded as an unusable recording medium (C) (YES in step S307), the CPU 11 concludes the process based on the information processing program. For example, as depicted in FIG. 19, the display 16 of the user terminal 10 presents a display screen 73 having the evaluation results and a finish button 74 used to finish the process. If the recording medium P is graded as a recording medium that cannot be transported (C) with respect to the transport property, printing by the printer 30 is impossible, and thus the profile of the recording medium P cannot be created (refer to the column labeled "PROFILE CREATION" depicted in FIG. 6). In response to the finish button 74 being pressed in the display screen 73, the process based on the information processing program ends.

The printer 30, which is electrically connected to the user terminal 10 described above, produces the following effect in addition to the effects produced by a configuration similar to the configuration described in the first exemplary embodiment.

The user terminal 10 outputs to the display 16 as an evaluation result the forbidding information to forbid printing by the printer 30 on the recording medium P and the restriction information to restrict the use of the recording medium P for the printer 30. Then, the user terminal 10 allows a profile for printing to be created unless the recording medium P is graded as an unusable recording medium, for which printing by the printer 30 is forbidden. Thus, in contrast to the case where it is determined by using only existing profiles of recording media whether a recording medium is usable, the existing profiles being stored in a printing machine, a new profile of the recording medium P for printing can be created for the printer 30 if there is no existing profile of the recording medium P for printing.

Third Exemplary Embodiment

Next, an information processing apparatus according to a third exemplary embodiment will be described. The same numbers are attached to elements that are the same as or similar to the elements in the first and the second exemplary embodiments, which are described above, and descriptions regarding such elements will be omitted.

In the third exemplary embodiment, a description will be given of another example of a user terminal 10 that is not electrically connected to a printer 30 in the information processing system 1, which is depicted in FIG. 1. According to the third exemplary embodiment, to examine performance indicators of the printer 30, an application on any user terminal 10 or an application for a web browser is used to determine whether a recording medium P is usable. In the third exemplary embodiment, the brand name or physical-property values of the recording medium P are stored, for example, in a storage unit 14 or other devices of the user terminal 10.

Figure 21:
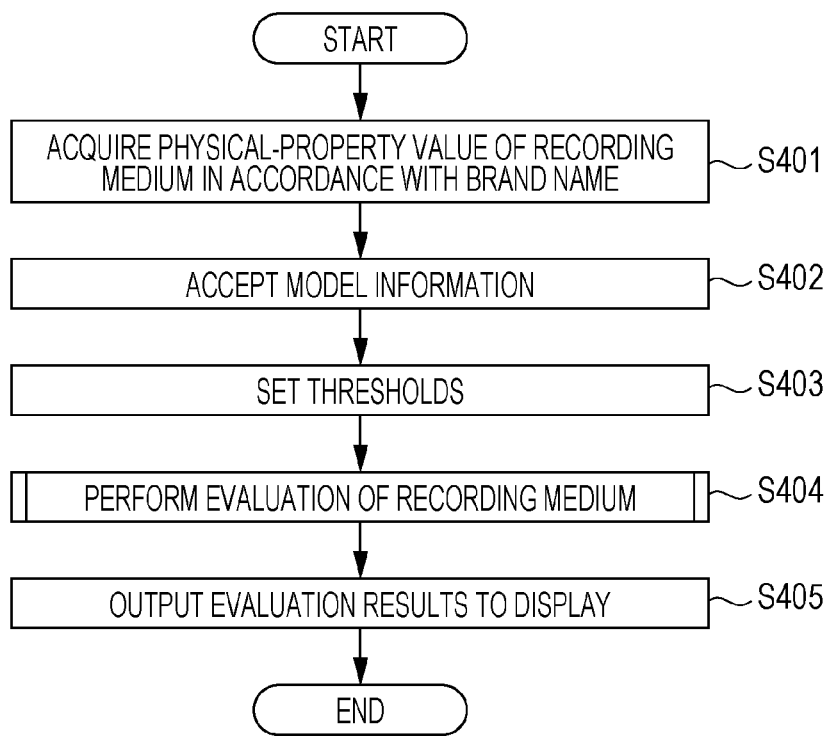
FIG. 21 is a flowchart depicting a process flow of an information processing apparatus according to a third exemplary embodiment.

FIG. 21 is a flowchart depicting a flow of information processing performed by using the user terminal 10 according to the third exemplary embodiment.

As depicted in FIG. 21, once a user starts the information processing, a CPU 11 acquires physical-property values of the recording medium P in accordance with the brand name of the recording medium P (step S401).

Figure 22:
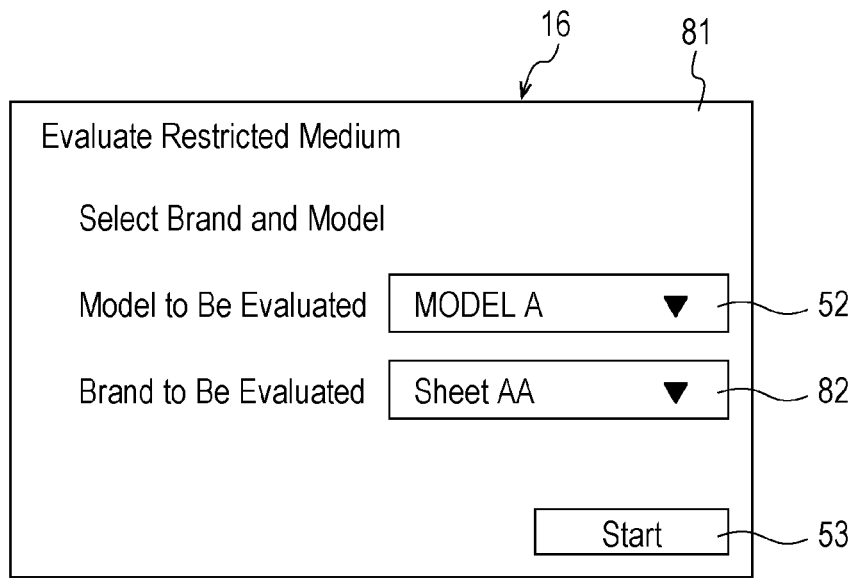
FIG. 22 is an illustration depicting an example of an input screen for entering the model of a printing machine and the brand name of a recording medium, and the input screen is presented by a display device of the information processing apparatus according to the third exemplary embodiment.

The CPU 11 accepts model information of the printer 30 (step S402). For example, as depicted in FIG. 22, the display 16 of the user terminal 10 presents a display screen 81 having an input section 52 used to enter or select the model of the printer 30 and a brand-name input section 82 used to enter or select the brand name of the recording medium P. The user uses the input section 52 in the display screen 81 to enter or select the model of the printer 30 (for example, model A), uses the brand-name input section 82 in the display screen 81 to enter or select the brand name of the recording medium P, and then presses a start button 53. In this way, the CPU 11 acquires physical-property values of the recording medium P in accordance with the brand name of the recording medium P and accepts the model information of the printer 30.

The CPU 11 sets thresholds in accordance with the model information of the printer 30 (step S403).

The CPU 11 performs an evaluation as to whether there is a possibility that the recording medium P causes trouble for printing by the printer 30 (step S404). The evaluation process is similar to the evaluation process described based on the flowcharts depicted in FIGS. 8 and 9.

The CPU 11 outputs evaluation results of the recording medium P to the display 16 (step S405). This operation concludes the process based on an information processing program. If a different model of the printer 30 or a different brand name of the recording medium P is entered or selected in step S402, thresholds are set in accordance with different model information of the printer 30, and an evaluation process is performed with respect to the different brand name of the recording medium P. Then, evaluation results corresponding to the different model information of the printer 30 is output to the display 16 with respect to the recording medium P.

The user terminal 10, which is described above, produces the following effect in addition to the effects produced by a configuration similar to the configuration described in the first exemplary embodiment.

The user terminal 10 accepts input information regarding the brand name of the recording medium P and acquires physical-property-value information of the recording medium P in accordance with the input information regarding the brand name of the recording medium P. Thus, the user terminal 10 can rapidly acquire physical-property values of the recording medium P, as compared with the case where a physical property of a recording medium is measured only by using a sensor.

Others

Figure 23:
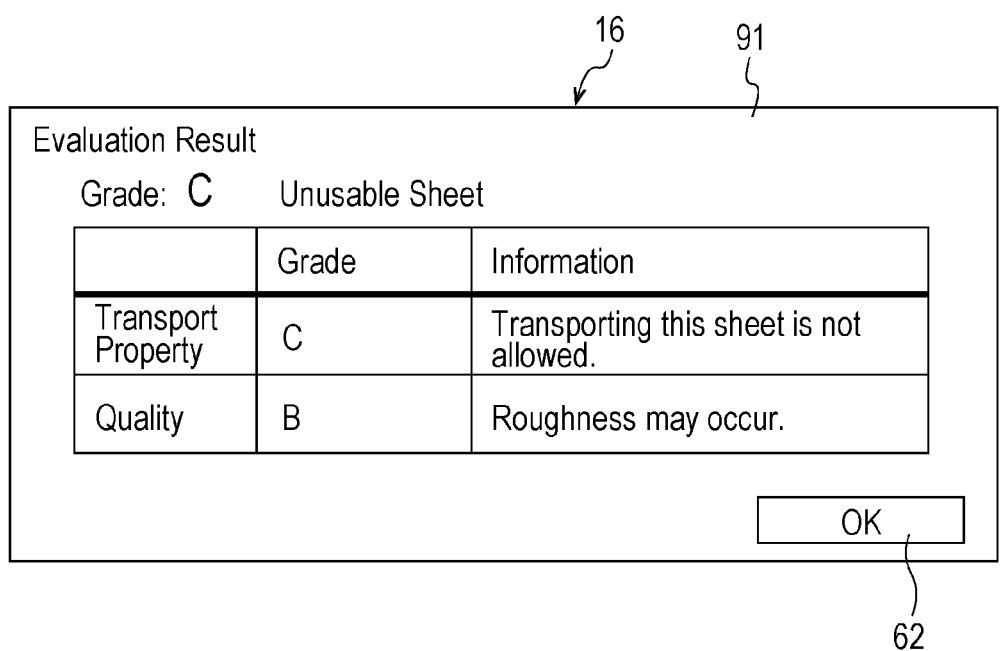
FIG. 23 is an illustration depicting an example of an evaluation result presented by a display device of an information processing apparatus according to an exemplary embodiment.

In the first to third exemplary embodiments, whether the recording medium P is usable is determined with respect to the transport property, the transfer property, the fixing property, and other properties of the printing performance indicators, but the present disclosure is not limited to such configurations. For example, whether the recording medium P is usable may be determined with respect to one or two of the printing performance indicators. If whether the recording medium P is usable is determined with respect to one or two of the printing performance indicators, the transport property may be selected as one of such printing performance indicators. In addition, as depicted in FIG. 23, evaluation results with respect to the transfer property and the fixing property may be combined into a single item named "Quality" and presented in a display screen 91 for evaluation results.

Evaluation results (for example, overall evaluation results) of multiple printers with respect to a single kind of printing performance indicator may be merged into a summary result, and the summary result may be presented. When a particular printer is selected in the summary result, the evaluation result may be presented in detail.

Evaluation results (for example, overall evaluation results) of multiple kinds of recording media with respect to a single printer may be merged into a summary result, and the summary result may be presented. When a particular recording medium is selected in the summary result, the evaluation result may be presented in detail.

The input section 52 is used to enter or select the model information of the printer 30 in the first to third exemplary embodiments, but the present disclosure is not limited to such configurations. For example, the information regarding the printer 30 may be received by using a wireless-communication receiver of the user terminal 10.

The brand-name input section 82 is used to enter or select the brand name of the recording medium P in the third exemplary embodiment, but the present disclosure is not limited to such a configuration. For example, the information regarding the brand name of the recording medium P may be received by using a wireless-communication receiver of the user terminal 10.

Evaluation results are presented by the display 16 of the user terminal 10 in the first to third exemplary embodiments, but the present disclosure is not limited to such configurations. For example, data regarding evaluation results may be output via a communication unit to a printing machine that is not electrically connected to the user terminal 10, and the evaluation results may be presented by a display device of the printing machine.

In each of the exemplary embodiments described above, various processors described below can be used to provide a hardware construction of a processing unit that performs various kinds of processing conducted by such units as the acquiring unit 101, the accepting unit 102, the evaluating unit 103, and the output unit 104. Examples of various processors include a programmable logic device (PLD), such as a field programmable gate array (FPGA), and dedicated electric circuitry, such as an application-specific integrated circuit (ASIC), in addition to the CPU described above, which is a general-purpose processor that executes software to function as various processing units. A PLD is a processor whose circuit configuration is modifiable after fabrication, and dedicated electric circuitry is a processor having a circuit configuration exclusively designed to execute specific processing.

A processing unit may be formed by one of the various processors described above or by a combination of two or more similar or dissimilar processors (for example, a combination of multiple FPGAs and/or a combination of a CPU and an FPGA). Further, multiple processing units may be formed by a single processor.

Examples of multiple processing units formed by a single processor include a processor that is formed by a combination of one or more CPUs and software and that functions as multiple processing units. Another example, which is represented, for example, by a system on chip (SoC), is a processor that uses a single integrated circuit (IC) chip to provide the entire function of a system including multiple processing units. In this way, the hardware construction of various processing units is formed by one or more processors of various kinds described above.

More specifically, the hardware construction of these processors of various kinds can be provided by using electric circuitry formed by a combination of circuit elements such as semiconductor devices.

The exemplary embodiments according to the present disclosure, which have been described as above, should not be construed as limiting the present disclosure in any way, and various aspects can obviously be embodied without departing from the spirit of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   at least one processor configured to:
      acquire physical-property-value information of a recording medium;
      using information regarding a printing machine, perform an evaluation as to whether there is a possibility that the recording medium causes trouble for printing by the printing machine, the evaluation being performed with respect to at least one printing performance indicator based on the physical-property-value information,
      wherein the at least one processor is configured to grade the recording medium to be a first grade, a second grade or a third grade based on the physical-property-value information and the information regarding a printing machine, wherein the first grade represents an usable recording medium for the printing machine, the second grade represents a conditionally usable recording medium, and the third grade represents an unusable recording medium, the unusable recording medium causes the trouble for printing by the printing machine; and
      output a result of the evaluation to a display device.

2. The information processing apparatus according to claim 1, further comprising:
   a sensor that measures a physical property of the recording medium or a receiver that receives measurement information obtained by the sensor,
   wherein the at least one processor is configured to acquire the physical-property-value information by converting a measurement value obtained by the sensor into a physical-property value of the recording medium.

3. The information processing apparatus according to claim 2,
   wherein the at least one processor is configured to:
      accept the information regarding the printing machine; and
      using the information regarding the printing machine, perform an evaluation as to whether there is a possibility that the recording medium causes trouble for the printing.

4. The information processing apparatus according to claim 3,
   wherein the at least one processor is configured to:
      perform an evaluation as to whether there is a possibility that the recording medium causes trouble for the printing, the evaluation being performed with respect to two or more printing performance indicators; and
      output a result of the evaluation to a display device separately for each of the printing performance indicators.

5. The information processing apparatus according to claim 2,
   wherein the at least one processor is configured to:
      perform an evaluation as to whether there is a possibility that the recording medium causes trouble for the printing, the evaluation being performed with respect to two or more printing performance indicators; and
      output a result of the evaluation to a display device separately for each of the printing performance indicators.

6. The information processing apparatus according to claim 5,
   wherein a plurality of printing machines are available, and the at least one processor is configured to:
      set evaluation thresholds with respect to each of the printing performance indicators for each model of the plurality of printing machines in accordance with the information regarding the model and perform an evaluation as to whether there is a possibility that the recording medium causes trouble for the printing; and
      output a result of the evaluation to the display device separately for each model of the plurality of printing machines.

7. The information processing apparatus according to claim 1,
   wherein the at least one processor is configured to:
      accept input information regarding a brand name of the recording medium; and
      acquire the physical-property-value information in accordance with the input information regarding the brand name of the recording medium.

8. The information processing apparatus according to claim 7,
   wherein the at least one processor is configured to:
      accept the information regarding the printing machine; and
      using the information regarding the printing machine, perform an evaluation as to whether there is a possibility that the recording medium causes trouble for the printing.

9. The information processing apparatus according to claim 8,
   wherein the at least one processor is configured to:
      perform an evaluation as to whether there is a possibility that the recording medium causes trouble for the printing, the evaluation being performed with respect to two or more printing performance indicators; and output a result of the evaluation to a display device separately for each of the printing performance indicators.

10. The information processing apparatus according to claim 7,
wherein the at least one processor is configured to:
perform an evaluation as to whether there is a possibility that the recording medium causes trouble for the printing, the evaluation being performed with respect to two or more printing performance indicators; and
output a result of the evaluation to a display device separately for each of the printing performance indicators.

11. The information processing apparatus according to claim 1,
wherein the at least one processor is configured to:
accept the information regarding the printing machine; and
using the information regarding the printing machine, perform an evaluation as to whether there is a possibility that the recording medium causes trouble for the printing.

12. The information processing apparatus according to claim 11,
wherein the at least one processor is configured to:
perform an evaluation as to whether there is a possibility that the recording medium causes trouble for the printing, the evaluation being performed with respect to two or more printing performance indicators; and
output a result of the evaluation to a display device separately for each of the printing performance indicators.

13. The information processing apparatus according to claim 1,
wherein the at least one processor is configured to:
perform an evaluation as to whether there is a possibility that the recording medium causes trouble for the printing, the evaluation being performed with respect to two or more printing performance indicators; and
output a result of the evaluation to a display device separately for each of the printing performance indicators.

14. The information processing apparatus according to claim 13,
wherein a plurality of printing machines are available, and the at least one processor is configured to:
set evaluation thresholds with respect to each of the printing performance indicators for each model of the plurality of printing machines in accordance with the information regarding the model and perform an evaluation as to whether there is a possibility that the recording medium causes trouble for the printing; and
output a result of the evaluation to the display device separately for each model of the plurality of printing machines.

15. The information processing apparatus according to claim 1,
wherein the display device is electrically connected to the at least one processor, and
the at least one processor is configured to cause the display device to present the result of the evaluation.

16. The information processing apparatus according to claim 1,
wherein the at least one processor is configured to:
output at least one of two types of information as the result of the evaluation, the two types of information being forbidding information to forbid printing by the printing machine on the recording medium and restriction information to restrict use of the recording medium for the printing machine.

17. The information processing apparatus according to claim 16,
wherein the at least one processor is configured to:
using upper and lower forbidding thresholds that are set in accordance with the information regarding the printing machine, determine whether to forbid printing on the recording medium; and
using upper and lower restriction thresholds that are set in accordance with the information regarding the printing machine, determine whether to restrict printing on the recording medium, the upper restriction threshold being smaller than the upper forbidding threshold and the lower restriction threshold being larger than the lower forbidding threshold.

18. A printing apparatus comprising:
the information processing apparatus according to claim 1; and
a printing unit that performs printing on the recording medium.

19. The printing apparatus according to claim 18,
wherein the at least one processor is configured to:
as the result of the evaluation, output forbidding information to forbid printing by the printing machine on the recording medium and restriction information to restrict use of the recording medium for the printing machine; and
allow a recording-medium setting for printing to be created unless the recording medium is graded as an unusable recording medium for which printing by the printing machine is forbidden.

20. A non-transitory computer readable medium storing a program causing a computer to execute a process for information processing, the process comprising:
acquiring physical-property-value information of a recording medium;
by using information regarding a printing machine, performing an evaluation as to whether there is a possibility that the recording medium causes trouble for printing by the printing machine, the evaluation being performed with respect to at least one printing performance indicator based on the physical-property-value information;
grading the recording medium to be a first grade, a second grade or a third grade based on the physical-property-value information and the information regarding a printing machine, wherein the first grade represents an usable recording medium for the printing machine, the second grade represents a conditionally usable recording medium, and the third grade represents an unusable recording medium, the unusable recording medium causes the trouble for printing by the printing machine; and
outputting a result of the evaluation to a display device.

* * * * *